United States Patent
Taki et al.

[15] 3,676,351
[45] July 11, 1972

[54] CERAMIC DIELECTRIC COMPRISING CALCIUM TITANOSILICATE

[72] Inventors: Hiromitsu Taki; Shigeru Hayakawa, both of Osaka; Kaneomi Nagase, Kyoto, all of Japan

[73] Assignee: Matsushita Electric Industrial Co., Ltd., Kadoma, Osaka, Japan

[22] Filed: Aug. 6, 1970

[21] Appl. No.: 61,745

Related U.S. Application Data

[63] Continuation-in-part of Ser. No. 682,506, Nov. 13, 1967, abandoned.

[30] Foreign Application Priority Data

March 27, 1967 Japan..................................42/19747

[52] U.S. Cl. ..........................252/63.5, 106/39 R, 252/520, 317/258
[51] Int. Cl. .........................................................H01b 3/02
[58] Field of Search..................106/39 R, 46; 252/63.5, 520; 317/258

[56] References Cited

UNITED STATES PATENTS

| | | | |
|---|---|---|---|
| 2,220,774 | 11/1940 | Navias | 106/39 R |
| 3,069,276 | 12/1962 | Domanski | 106/39 R |
| 2,277,734 | 3/1942 | Wainer | 106/46 |

FOREIGN PATENTS OR APPLICATIONS 1,029,539   5/1966   Great Britain ......................106/39 R

OTHER PUBLICATIONS

De Vries, R. C. et al., Phase Equilibrium in the System $CaO-TiO_2 - SiO_2$, in T. Amer. Cer. Soc., 38, 1955 pp. 158–161.

*Primary Examiner*—Tobias E. Levow
*Assistant Examiner*—W. R. Satterfield
*Attorney*—Wenderoth, Lind & Ponack

[57] ABSTRACT

Dielectric ceramics having a high dielectric constant, an extremely low dissipation factor, and a controlled temperature coefficient of dielectric constant between +800 and −1,000ppm/° C consists, according to this invention, of three phases composed essentially of,

| | Mol percent |
|---|---|
| calciumtitanosilicate | 10 ~ 99.5 |
| strontium titanate | 0.5 ~ 30 |
| titanium dioxide | remainder. |

3 Claims, 2 Drawing Figures

INVENTORS
HIROMITSU TAKI
SHIGERU HAYAKAWA
KANEOMI NAGASE
BY Wenderoth, Lind & Ponack
ATTORNEYS

CERAMIC DIELECTRIC COMPRISING CALCIUM TITANOSILICATE

This application is a continuation in part of applicant's abandoned application Ser. No. 682,506, filed Nov. 13, 1967, and assigned to the same assignee as the present invention.

This invention relates to novel ceramic materials for ceramic capacitors operating at a high frequency and more particularly to dielectric ceramic compositions comprising calcium titanosilicate, titanium dioxide, and strontium titanate.

The electronic industry has recently required dielectric materials suitable for making temperature compensated capacitors operating at high frequency, for example in a megaherz range of 1-30 MHz. It is important for making such capacitors that dielectric materials have a high dielectric constant, a low dissipation factor, and controlled temperature coefficient of dielectric constant.

Polycrystalline ceramics such as titanium dioxide, magnesium titanate, calcium titanate, strontium titanate, and calcium titanosilicate are well known materials adapted for temperature compensated capacitors. However, conventional dielectric ceramic are usually bound up with a drawback that when these materials are improved so as to exhibit the temperature coefficient of dielectric constant of nearly zero value, the dielectric constant is lowered, and are not suitable for use in high dielectric constant-temperature compensated capacitors.

Titanium dioxide is well known dielectric material with a temperature coefficient of dielectric constant of about 750 ppm/° C, a dielectric constant of 90-108, and dissipation factor at 1 MHz of about 0.0003. Strontium titanate has a temperature coefficient of about −4,600 ppm/° C, a dielectric constant of 280 and dissipation factor of 1 MHz of 0.0005. Calcium titanosilicate has a temperature coefficient of about +1,200 ppm/° C, a dielectric constant of 30-45, and dissipation factor at 1 MHz of about 0.0005.

In addition, the electronics art has recently tended toward the miniaturization and the molding of circuits and has required dielectric materials having a high breakdown voltage for the production of thin film capacitors. Previous dielectrics with similar characteristics has a lower breakdown voltage for use in thin film capacitors.

Accordingly, a principal object of the present invention is to provide novel dielectric materials in the form of ceramics having dielectric constants much higher than those of the conventional dielectric ceramics.

A further object of the present invention is to provide dielectric ceramics characterized by high dielectric constant, low dissipation factor, high breakdown voltage, and controlled linear temperature coefficient of dielectric constant within a wide range from approximately −1,000 to +800 ppm/° C.

These and other objects of this invention will become apparent upon consideration of the following detailed description taken together with accompanying drawings in which.

Figure 1:
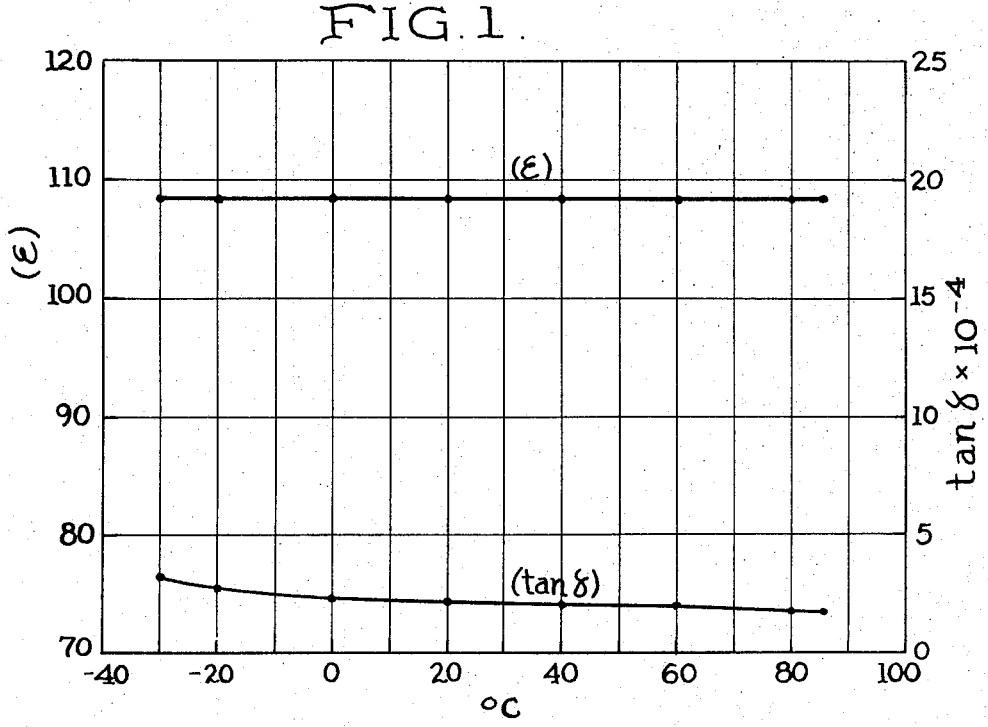
FIG. 1 is a graph of the dielectric material in accordance with the present invention illustrating the variation of dielectric constant and dissipation factor with temperature.

In accordance with the present invention, it has been discovered that ceramic materials in a composition consisting essentially of 10–99.5 mol percent of calcium titanosilicate ($CaTiSiO_5$), 0.5–30 mol percent of strontium titanate ($SrTiO_3$) and remainder of titanium dioxide ($TiO_2$) have a high dielectric constant, a low dissipation factor, a high breakdown voltage and a controlled linear temperature coefficient of dielectric constant of +800 to −1,000 ppm/° C. These ceramic materials exist in three phases of sphene structure, perovskite structure and rutile structure. In the absence of titanium dioxide, these ceramic materials exist in two phases of sphene structure and perovskite structure.

The component oxides are intimately mixed in desired composition proportions and fired in accordance with a schedule set forth hereinafter for production of a fired ceramic body.

The raw materials are a reagent-grade calcium carbonate ($CaCO_3$), a pure grade strontium carbonate ($SrCO_3$), a high purity silica ($SiO_2$) and a commercially pure grade titanium dioxide ($TiO_2$). Any compound which is converted to the corresponding calcium oxide or strontium oxide upon firing can be used as raw material. Batches are ball milled with water for intimate mixing and then dried. Usually, they are pressed loosely into pellet form and calcined in a covered alumina crucible. Strontium titanate ($SrTiO_3$) is produced by calcining strontium carbonate-titanium dioxide mixture at 1,100° C for 2 hours and calcium titanosilicate ($CaTiSiO_5$) is produced by calcining calcium carbonate-titanium dioxide-silicon dioxide mixture at 1,050° for 2 hours.

The starting materials are thoroughly mixed with water in a ball mill using agate pebbles. The resultant mixture is dried at 150° C. The resultant powder is admixed with an emulsion of binding agents such as polyvinyl alcohol (PVA) in a proportion of 100 grams of the powder to 8 cc of 6 percent aqueous emulsion of PVA. The powder is pressed at 750 Kg/cm$^2$ into the form of discs. These discs are fired at a temperature ranging from 1,150° to 1,320° C for 2 hours. A temperature rising rate of 5° C per minute is maintained. After soaking at 1,150°- to 1,320° C for 2 hours, they are cooled at "furnace power off."

Silver paste is fired on the disc surfaces to form electrodes in per se conventional manner.

The dielectric constant and dissipation factor were measured with a conventional capacitance bridge at 20° C and 50 percent rh, at a frequency of 1 MHz and 10 MHz, and with 0.10 V/cm peak to peak. The temperature coefficient of dielectric constant is calculated from the temperature variation of the dielectric constant over a temperature range of −30° to +85° C and expressed with a unit of parts per million per C, (p.p.m/° C). The breakdown voltage test is done in silicon oil at 100° C by applying a d.c. field for 30 minutes.

The foregoing procedure is followed by each of the compositions hereinafter enumerated.

Referring to Table 1, variation in the dielectric constant and dissipation factor at 20° C, temperature coefficient of dielectric constant and breakdown voltage of dielectric elements employing the ceramic materials in accordance with the present invention are shown as a function of the compositions. After firing, the ceramic specimens are analyzed with a Geiger-counter type X-ray diffractionmeter using CuK radiation. It has been discovered according to the present invention that ceramic materials in a composition shown in Table 2 have high dielectric constant and low dissipation factor and are suitable for use in temperature compensated capacitors. These ceramic materials exist in two phases of sphene structure ($CaTiSiO_5$) and perovskite structure ($SrTiO_3$). It is possible for these ceramic materials to realize a wide range of temperature coefficient of +800 to −1,000 ppm/° C without impairing dielectric constant and dissipation factor.

TABLE 1

| | Composition (mol percent) | | Dielectric constant at 1 mHz | Dissipation factor (×10⁻⁴) | | Temperature [1] | Break down voltage (kv./mm.) |
|---|---|---|---|---|---|---|---|
| | $CaTiSiO_5$ | $SrTiO_3$ | | 1 mHz | 10 mHz | | |
| Number: | | | | | | | |
| 1* | 100 | 0 | 45 | 5 | 6.2 | +1,200 | 31.2 |
| 2* | 99.8 | 0.2 | 45.7 | 4.2 | 5.3 | +1,100 | 33.0 |

TABLE 1—Continued

| | Composition (mol percent) | | Electrical properties | | | | |
|---|---|---|---|---|---|---|---|
| | | | Dielectric constant at 1 mHz | Dissipation factor ($\times 10^{-4}$) | | Temperature[1] | Break down voltage (kv./mm.) |
| | CaTiSiO$_5$ | SrTiO$_3$ | | 1 mHz | 10 mHz | | |
| 3 | 99.5 | 0.5 | 47.6 | 4.0 | 4.5 | +1,020 | 35.2 |
| 4 | 99 | 1 | 48.8 | 4.0 | 4.5 | +950 | 36.8 |
| 5 | 95 | 5 | 56.4 | 4.5 | 4.8 | +640 | 37.4 |
| 6 | 90 | 10 | 74.1 | 3.8 | 4.2 | +360 | 37.5 |
| 7 | 85 | 15 | 87.2 | 2.6 | 3.0 | +86 | 37.5 |
| 8 | 80 | 20 | 107 | 3.0 | 3.5 | −180 | 37.9 |
| 9 | 75 | 25 | 114 | 3.2 | 2.6 | −410 | 38.0 |
| 10 | 70 | 30 | 128.5 | 3.6 | 3.8 | −960 | 36.5 |
| 11* | 65 | 35 | 132 | 8.6 | 15.8 | −980 | 20.6 |
| 12* | 0 | 100 | 280 | 5.0 | 7.2 | −4,600 | 34.1 |

[1] Coefficient of dielectric constant in p.p.m./° C.(−30−+85° C.).
*Sample is for comparison.

TABLE 2

| | Preferable mol percent |
|---|---|
| CaTiSiO$_5$ | 70–99.5 |
| SrTiO$_3$ | 0.5–30 |

An increase in the amount of SrTiO$_3$ makes the dielectric constant higher. For instance, the composition comprising 80 mol percent of CaTiSiO$_5$ and 20 mol percent of SrTiO$_3$ shows a dielectric constant of 101 with a low dissipation factor of 3.0 × 10$^{-4}$ at 1MHz and a temperature coefficient of −180 ppm/° C. In the compositions comprising less than 0.5 mol percent of SrTiO$_3$ and more than 99.5 mol percent of CaTiSiO$_5$, there appears only, a single phase of sphene structure. The fired body existing in such single phase shows a low dielectric constant. The compositions comprising more than 30 mol percent of SrTiO$_3$ and less than 70 mol percent of CaTiSiO$_5$ result in a high dissipation factor.

It is further discovered according to the present invention that ceramic materials in a composition shown by Table 3 exhibit a higher dielectric constant than those of the ceramic materials shown in Table 2.

TABLE 3

| | Preferable mol percent |
|---|---|
| CaTiSiO$_5$ | 10–69.5 |
| TiO$_2$ | 0.5–89.5 |
| SrTiO$_3$ | 0.5–30 |

The ceramic materials of Table 3 give three phases of sphene structure (CaTiSiO$_5$), rutile structure (TiO$_2$), and perovskite structure (SrTiO$_3$). The dielectric constant of these ceramic materials ranges from 50 to 164 while the dissipation factor and the temperature coefficient are essentially similar to those of ceramic materials of Table 2. The dielectric properties of the ceramic materials in accordance with the present invention are shown in Table 4.

Table 4 shows that the compositions can exhibit an excellent dielectric activity. As apparent from Table 5, for example, an increase in the amount of SrTiO$_3$ makes the dielectric constant higher.

The ceramic materials according to the present invention have dielectric constant which varies linearly with temperature in the temperature range of −30° to +85° C. FIG. 1 shows typical temperature dependence of capacitance of sample No. 16 in Table 4.

Figure 2:
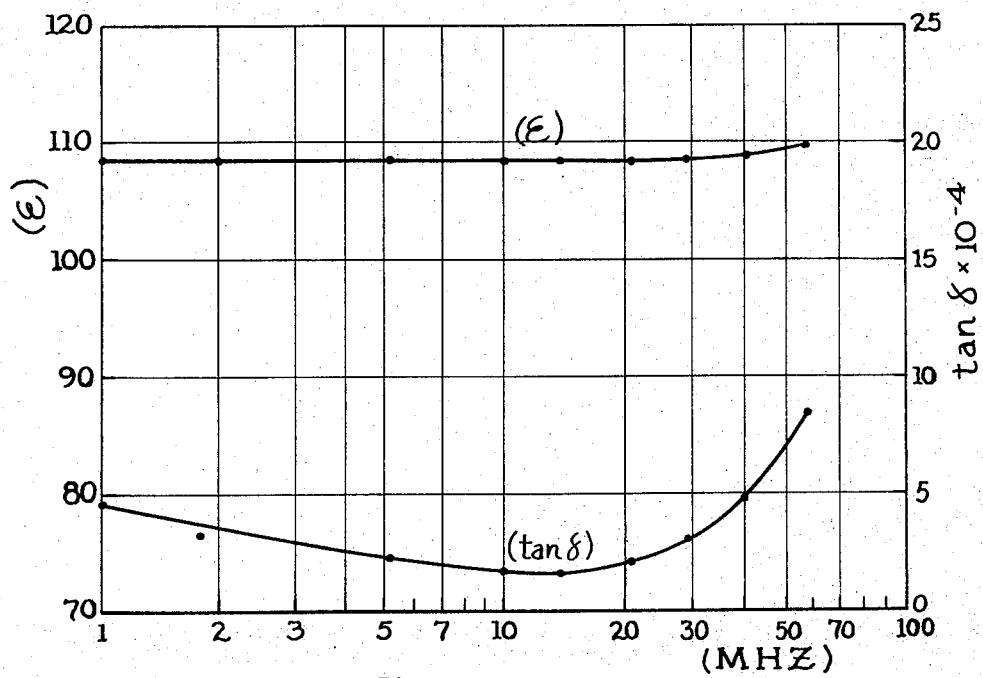
FIG. 2 shows, for the dielectric material in accordance with the present invention, the variation of dielectric constant and dissipation factor with frequency at 20° C.

FIG. 2 shows the variation of dielectric constant and dissipation factor with a variation in frequency from 1 KHz to about 50 MHz at 20° C. The used ceramic material is sample No. 16 in Table 4. The dielectric constant of this ceramic material is constant over this frequency range whereas the dissipation factor starts increasing from about 30 MHz.

As shown in Tables 1, 3 and 4, the ceramic materials according to the present invention can make it possible to pro-

TABLE 4

| | Composition (mol percent) | | | Electrical properties | | | | |
|---|---|---|---|---|---|---|---|---|
| | | | | Dielectric constant at 1 mHz | Dissipation factor ($\times 10^{-4}$) | | Temperature[1] | Break down voltage (kv./mm.) |
| | CaTiSiO$_5$ | TiO$_2$ | SrTiO$_3$ | | 1 mHz | 10 mHz | | |
| Number: | | | | | | | | |
| 13 | 93 | 2 | 5 | 57.5 | 3.6 | 3.9 | +620 | 40.5 |
| 14 | 75 | 20 | 5 | 69.8 | 2.0 | 2.2 | +550 | 45.0 |
| 15 | 55 | 40 | 5 | 91.7 | 2.1 | 1.8 | +150 | 50.2 |
| 16 | 35 | 60 | 5 | 108.6 | 2.8 | 3.2 | −180 | 43.0 |
| 17 | 10 | 85 | 5 | 120.4 | 2.5 | 3.0 | −620 | 40.9 |
| 18 | 69 | 20 | 11 | 70.2 | 2.6 | 2.6 | +505 | 48.2 |
| 19 | 54 | 35 | 11 | 104 | 2.4 | 2.2 | +100 | 48.0 |
| 20 | 40 | 49 | 11 | 108.5 | 2.2 | 1.9 | +15 | 50.5 |
| 21 | 19 | 70 | 11 | 109.8 | 2.1 | 2.6 | −250 | 43.9 |
| 22 | 40 | 40 | 20 | 110 | 2.8 | 3.0 | −75 | 43.6 |
| 23 | 20 | 60 | 20 | 152.7 | 4.0 | 4.5 | −650 | 34.1 |
| 24 | 10 | 70 | 20 | 153.3 | 3.0 | 3.2 | −920 | 31.2 |

[1] Coefficient of dielectric constant in p.p.m./C(−30−+85° C.).

TABLE 5

| | Composition (mol percent) | | | Electrical properties | | | | |
|---|---|---|---|---|---|---|---|---|
| | | | | Dielectric constant at 1 mHz | Dissipation factor ($\times 10^{-4}$) | | Temperature[1] | Break down voltage (kv./mm.) |
| | CaTiSiO$_5$ | TiO$_2$ | SrTiO$_3$ | | 1 mHz | 10 mHz | | |
| Number: | | | | | | | | |
| 25* | 40 | 60 | 0 | 64 | 6.0 | 6.5 | −180 | 35.6 |
| 26* | 31.95 | 60 | 0.05 | 67.1 | 5.7 | 6.4 | −195 | 36.8 |
| 27* | 39.9 | 60 | 0.1 | 70 | 5.0 | 5.3 | −210 | 37.0 |
| 28 | 39.5 | 60 | 0.5 | 101 | 3.2 | 3.6 | −120 | 42.4 |
| 29 | 35 | 60 | 5 | 108.6 | 2.8 | 3.7 | −180 | 48.6 |
| 30 | 30 | 60 | 10 | 140.4 | 3.3 | 4.0 | −250 | 48.5 |
| 31 | 20 | 60 | 20 | 152.7 | 4 | 4.5 | −650 | 40.7 |
| 32 | 10 | 60 | 30 | 164.2 | 4.9 | 5.0 | −1,000 | 38.8 |
| 33* | 8 | 60 | 32 | 181 | 7.0 | 12.4 | −1,720 | 26.8 |

[1] Coefficient of dielectric constant in p.p.m./° C. (−30−+85° C.).
*Sample is for comparison.

vide a wide variation in the temperature coefficient without impaining dielectric constant and dissipation factor. This is due to the fact that the ceramic materials exist in two or three phases.

What is claimed is:

1. A fired ceramic dielectric composition having a dielectric constant of 50 to 164, a dissipation factor below $5 \times 10^{-4}$, and a linear temperature coefficient of dielectric constant of +800 to −1,000 parts per million per °C in the temperature range of −30° to + 85° C, said composition consisting essentially of mixed phases of 10 to 99.5 mole percent of calcium titanosilicate, 0.5 to 30 mole percent of strontium titanate and the remainder being titanium dioxide.

2. A fired ceramic dielectric composition having a dielectric constant of 50 to 164, a dissipation factor below $5 \times 10^{-4}$, and a linear temperature coefficient of dielectric constant of +800 to −1,000 parts per million per °C in the temperature range of −30° to 85° C, said composition consisting essentially of two phases of 70 to 99.5 mole percent of calcium titanosilicate and 0.5 to 30 mole percent of strontium titanate.

3. A fired ceramic dielectric composition having a dielectric constant of 50 to 164, a dissipation factor below $5 \times 10^{-4}$, and a linear temperature coefficient of dielectric constant of +800 to −1,000 parts per million per °C in the temperature range of −30° to +85° C, said composition consisting essentially of three phases of 10 to 69.5 mole percent of calcium titanosilicate, 0.5 to 89.5 mole percent of titanium dioxide and 0.5 to 30 mole percent of strontium titanate.

* * * * *